United States Patent
Milojicic et al.

(10) Patent No.: US 10,303,615 B2
(45) Date of Patent: May 28, 2019

(54) MATCHING POINTERS ACROSS LEVELS OF A MEMORY HIERARCHY

(71) Applicant: HEWLETT PACKARD ENTERPRISE DEVELOPMENT LP, Houston, TX (US)

(72) Inventors: Dejan S. Milojicic, Palo Alto, CA (US); Moritz J. Hoffmann, Palo Alto, CA (US); Alexander Richardson, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 56 days.

(21) Appl. No.: 15/625,631

(22) Filed: Jun. 16, 2017

(65) Prior Publication Data
US 2018/0365158 A1    Dec. 20, 2018

(51) Int. Cl.
*G06F 12/10* (2016.01)

(52) U.S. Cl.
CPC ...... *G06F 12/10* (2013.01); *G06F 2212/1008* (2013.01)

(58) Field of Classification Search
CPC ...... G06F 12/02; G06F 12/1036; G06F 12/14; G06F 12/145; G06F 12/10; G06F 2212/1008; G06F 2209/481
See application file for complete search history.

(56) References Cited

U.S. PATENT DOCUMENTS

| | | | |
|---|---|---|---|
| 5,845,331 A | 12/1998 | Carter et al. | |
| 6,182,158 B1 | 1/2001 | Kougiouris et al. | |
| 7,747,594 B2 | 6/2010 | Probert et al. | |
| 7,873,776 B2 | 1/2011 | Hetherington et al. | |
| 8,544,001 B2 | 9/2013 | Gagner et al. | |
| 9,019,286 B2 | 4/2015 | Becker | |
| 9,535,606 B2 | 1/2017 | Krithivas et al. | |
| 9,563,557 B2 | 2/2017 | Kumar et al. | |
| 2002/0038390 A1 | 3/2002 | Callsen et al. | |
| 2005/0138263 A1* | 6/2005 | McKeen | G06F 12/14 711/1 |

(Continued)

OTHER PUBLICATIONS

Daglis, A. et al., Manycore Network Interfaces for In-Memory Rack-Scale Computing, (Research Paper), In Proceedings of the 42nd International Symposium on Computer Architecture (ISCA 2015), Jun. 13, 2015, pp. 567-579.

(Continued)

*Primary Examiner* — Hiep T Nguyen (74) *Attorney, Agent, or Firm* — Hewlett Packard Enterprise Patent Department (57) ABSTRACT

In one example in accordance with the present disclosure, a system may comprise a memory accessor to access a memory and a pointer loader to load a virtual address (VA) pointer corresponding to a first location in the memory and a physical address (PA) pointer corresponding to the VA pointer. The system may comprise a pointer handler to determine a first physical address in the memory mapped to the first location in the memory and a location matcher to determine whether the second physical address mapped to the PA pointer matches the first physical address. The system may also comprise an exception handler to raise an exception when the second physical address does not match the first physical address.

20 Claims, 6 Drawing Sheets

(56) References Cited

U.S. PATENT DOCUMENTS

| | | |
|---|---|---|
| 2008/0028401 A1 | 1/2008 | Geisinger |
| 2009/0106541 A1 | 4/2009 | Mizuno et al. |
| 2011/0078342 A1 | 3/2011 | Siddabathuni et al. |
| 2014/0289411 A1 | 9/2014 | Bornstein et al. |
| 2016/0210048 A1 | 7/2016 | Frank et al. |
| 2016/0283303 A1 | 9/2016 | Sharma et al. |
| 2018/0004531 A1* | 1/2018 | Chen ............... G06F 3/0604 |
| 2018/0063158 A1 | 3/2018 | Dalton et al. |

OTHER PUBLICATIONS

Falsafi, B. et al., Rack-Scale Computing, (Research Paper), Dagstuhl Seminar 15421), Oct. 11-16, 2015, vol. 5, No. 10, 15 Pgs.

System Virtual Machines, (Research Paper), Retrieved Apr. 10, 2017, 48 Pgs.

Alhamazani, K. et al., Cross-Layer Multi-Cloud Real-Time Application QoS Monitoring and Benchmarking As-A-Service Framework, (Research Paper), Feb. 1, 2015, 13 pages.

Coulouris, G., et al; "Chorus", Distributed Systems: Concepts and Design, Edition 2, 1994, 11 pages. retrieved from www.cdk5.net/oss/Ed2/Chorus.pdf.

Coulouris, G.; et al.; "Chapter CDK3-18 Mach Case Study", Distributed Systems: Concepts and Design, Edition 3, 2001, 18 pages; retrieved from www.cdk5.net/oss/Ed3/Mach.pdf.

Frantz, B., et al.; "GNOSIS: A Prototype Operating System for the 1990's"; 1995; 25 pages; retrieved from http://www.cis.upenn.edu/~KeyKOS/Gnosis/Gnosis.html.

Key Logic, Inc.; "KeyKOS—A Secure, High-Performance Environment for S/370"; Mar. 1988; retrieved from http://www.cis.upenn.edu/~KeyKOS/Key370/Key370.html, 14 pages.

Levy, Henry M., "The IBM System/38", Capability-Based Computer Systems, 1984, pp. 137-158, Digital Press.

Linaro; Linaro Launches OperiDataPlane™ (ODP) Project to Deliver Open-Source, Cross-Platform Interoperability for Networking Platforms, (Research Paper), Oct. 29, 2013, 5 pages.

Parmer; G.; "Composite Component-Based OS"; 2013; retrieved from http://composite.seas.gwu.edu/, 5 pages.

Singhania, A., et al.; "Capability Management in Barrelfish: Barrelfish Technical Note 013"; Dec. 1, 2013; 43 pages; retrieved from http://www.barrelfish.org/TN-013-CapabilityManagement.pdf.

Watson, R.; "Capability Hardware Enhanced RISC Instructions (CHERI)"; May 18, 2016; retrieved from http://www.cl.cam.ac.uk/research/security/ctsrd/cheri/, 3 pages.

Wikipedia, "Barrelfish", May 18, 2016; 2 pages; retrieved from https://en.wikipedia.org/wiki/Barrelfish.

Wikipedia, "EROS (microkernel)"; May 18, 2016; 4 pages; retrieved from https://en.wikipedia.org/wiki/EROS_(microkernel).

Wikipedia, "L4 microkernel family"; May 18, 2016; 8 pages; retrieved from https://en.wikipedia.org/wiki/L4_microkernel_family.

* cited by examiner

MATCHING POINTERS ACROSS LEVELS OF A MEMORY HIERARCHY

BACKGROUND

Virtual memory is a logical construct that maps a set of address ranges, or virtual addresses, to actual locations in physical memory. Virtual memory techniques allow a system to virtualize physical memory and map the virtualized memory into multiple virtual address spaces that may be accessed by processes executing on the system.

BRIEF DESCRIPTION OF THE DRAWINGS

The following detailed description references the drawings, wherein.

DETAILED DESCRIPTION

Capabilities are unforgeable tokens of authority that represent and protect system resources, such as memory. Capability based systems may use instruction set architecture (ISA) support to enforce fine-grained memory protection. The ISA is an interface between a system's hardware and software that defines instructions that can be executed by the system. The fine grained memory protection may be built on top of lower layer memory-management unit (MMU) protection and translation typically based on paging mechanisms and enforced by page tables and operating systems. There could be multiple layers of such protection and translation mechanisms. Capability-based systems supported by ISA mechanisms are agnostic of the lower layers of translation but make strong assumptions that the underlying layers will not change translation during the lifetime of capabilities, i.e. that virtual addresses supported by capabilities will always point to the same physical memory mapped into the virtual address space where the capabilities are located. This assumption is complicated by the need for sharing memory, in particular with persistent memory which has a much longer lifetime than any process or even instance of an operating system. This limits the use of capability in rack-scale systems with large non-volatile memories. A rack-scale system is a type of disaggregated computing architecture where a plurality of individual components behaves as a virtualized server. These components may include large amounts of memory and computing nodes tightly coupled through a fast fabric, and enable the virtualized server to manage and access a globally accessible pool of low latency, byte addressable memory.

Many bugs and security compromises may come from unauthorized access to memory such as buffer and stack overflows. These compromises can happen because of the lack of fine-grained protection: page-level hardware protection cannot prevent unauthorized access within a page. Rack-scale systems that target petabytes of memory, such as non-volatile memory (NVM) and thousands of computing nodes, may aggravate this problem because of the load/store interface to globally accessible, shared memory. In other words, as byte addressable data becomes persistently allocated memory and survives the lifetime of a process, the paging mechanism may become less useful for access control. Capabilities may enable fine-grained protection to eliminate these bugs and security compromises.

The systems and methods discussed herein extend the traditional capabilities that typically point to some data in a virtual address space with additional addresses in physical address space and/or their backing physical address spaces. The systems and methods may also provide additional checking at each memory access (i.e. as the page tables are traversed), to determine whether the physical address also matches the previously mapped one. If so, access is allowed. If physical addresses do not match, a page fault may be raised.

A system for matching pointers across levels of a memory hierarchy may comprise a memory accessor to access a memory and a pointer loader to load a virtual address (VA) pointer corresponding to a first location in the memory and a physical address (PA) pointer corresponding to the VA pointer. The system may comprise a pointer handler to determine a first physical address in the memory mapped to the first location in the memory and a location matcher to determine whether the second physical address mapped to the PA pointer matches the first physical address. The system may also comprise an exception handler to raise an exception when the second physical address does not match the first physical address.

Figure 1:
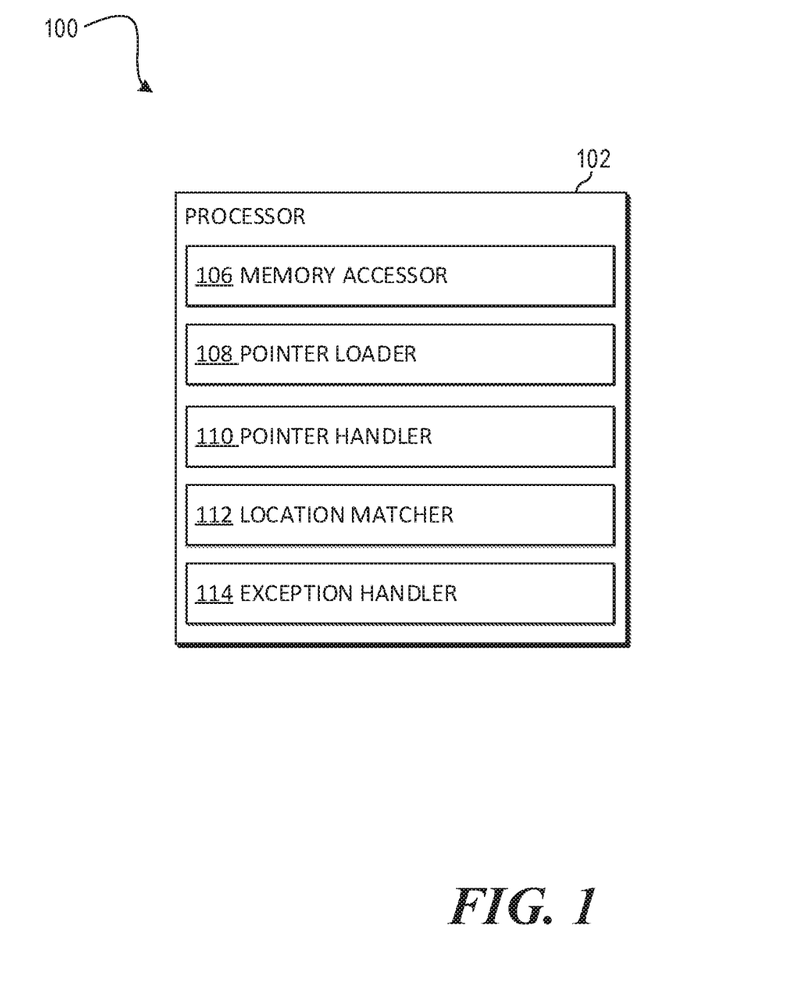
FIG. 1 is a block diagram of an example system for matching pointers across levels of a memory hierarchy.

FIG. 1 is a block diagram of an example system 100 for matching pointers across levels of a memory hierarchy. System 100 may include a processor 102 that may include a single or multiple Central Processing Units (CPUs) or another suitable hardware processor(s).

System 100 includes components to be executed by processor 102 including memory accessor 106, pointer loader 108, pointer handler 110, location matcher 112, exception handler 114, and/or other components. The system 100 may implement the components 106-114 in various ways, for example as hardware and programming. Implementations of components 106-114 include electronic circuitry (i.e., hardware) that implements the functionality of engines 110-114, such as processor 102, an integrated circuit, programmable circuit, application integrated circuit (ASIC), controller, semiconductor, processing resource, chipset, or other type of hardware component capable of implementing the functionality of components 106-114. Alternatively, components 106-114 may include instructions (e.g., stored on a machine-readable medium) that, when executed by a hardware component (e.g., controller and/or processor), implement the functionality of components 106-114. Furthermore, in FIG. 1 and other Figures described herein, different numbers of components or entities than depicted may be used.

Processor 102 may execute memory accessor 106 to access a memory. For example, the memory may be part of a data-centric rack-scale system with large amounts of memory, such as non-volatile memory (NVM), and thousands of computing nodes. These systems may be coupled through a fabric, and enable the computing nodes to see a globally accessible pool of low latency, byte addressable memory.

Processes accessing the memory may interact with a virtual address space (VAS) mapped to the physical memory.

These mappings may be included in a page table. The page table may be accessible via an operating system and/or in user accessible memory space via special privileges. In this manner, access to physical memory is protected by memory-management units (MMUs). An operating system (OS) may manage the MMUs, but may not intercept memory accesses from user space. Moreover, processes may have permissions to dereference pointers to virtual addresses rather than having permissions to directly access physical memory. Therefore, storing pointer-rich data structures in persistent memory can lead to dangling pointers or invalid references to volatile resources when regions are remapped at another address.

Processor 102 may execute pointer locator 108 to load a virtual address (VA) pointer corresponding to a first location in the memory and a physical address (PA) pointer corresponding to the VA pointer. Processor 102 may execute pointer handler 110 to determine a first physical address in the memory mapped to the VA pointer. Processor 102 may execute location matcher 112 to determine whether the second physical address mapped to the PA pointer matches the first physical address.

In some aspects, the VA pointer and the PA pointer are part of a single capability. For example, a virtual address capability may be expanded to also have an associated physical address capability attached. In some aspects, whether a physical capability is attached may be determined by whether a certain bit is set in the virtual capability. A range may be reserved in the VAS that contains the mapped physical address. The reserved range may be accessed using persistent memory load/store operations. In some aspects, capabilities may refer to memory addresses within the same region of memory. In aspects using NVM, capabilities may not be stored in an NVM that refers to volatile data because the interpretation of those capabilities may depend on the current MMU mappings.

The virtual address pointer and associated physical address capability may be loaded into registers together. Upon each memory access, the virtual address may be resolved. The virtual address may be resolved by accessing a virtual to physical address mapping, such as a page table. While the translation from virtual to physical address is occurring, the physical address may be analyzed to determine whether the virtual address mapped to the physical address matches the virtual address in the virtual address capability. In some aspects, the page table may be accessible via the operating system and the operating system may perform the translation. If the mapping does not match, an exception may be raised that can lead to establishing the correct mapping or taking other actions.

In some aspects, the VA pointer and the PA pointer may each be separate capabilities. In additional to a virtual address capability, an additional capability that contains the physical address can be used in case there is a possibility that the underlying physical memory can be remapped to another virtual memory address. The two capabilities may be collocated and one or both capabilities may be marked so that both need to be checked at the same time for validity. When memory is accessed, both capabilities are passed to the CPU (or memory controller and the page walker, etc.) which checks the validity of the physical address. If caches are indexed by the virtual address, they may be invalidated when the underlying physical address changes. If caches are indexed by the physical address, then no invalidation is required.

In some aspects, the existing capability size of the virtual address capability may be extended to store the physical address in the capability. Using capabilities can provide the consistency guarantees of securely linking the different addresses together. Although capabilities may be used in some aspects, other orthogonal mechanisms, such as pointers, may be used.

Figure 2A:
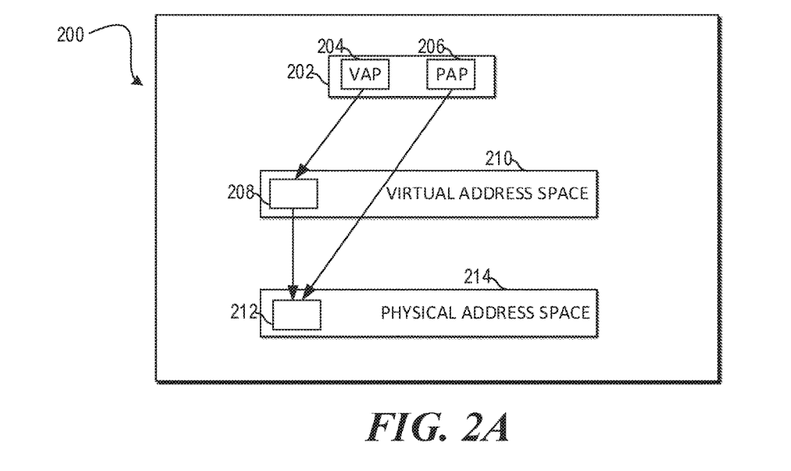
FIG. 2A is a flowchart of an example address mapping.

Turning briefly to FIG. 2A, an example address mapping 200 is illustrated. The address mapping 200 includes a set of pointers 202 including a virtual address pointer 204 (first pointer) and a physical address pointer 206 (second pointer). As described above, the set of pointers may be part of a capability, may be two separate capabilities, etc. The virtual address pointer 204 points to a virtual address 208 (first location in memory) in a virtual address space 210. The physical address pointer 206 may point to a physical address 212 in a physical address space 214. Pointer locator 108 may load virtual address pointer (VAP) 204 corresponding to virtual address location 208 in virtual address space 210. Pointer locator 108 may also load Physical address pointer (PAP) 206 that may correspond to physical address location 212 in physical address space 214. Pointer handler 110 may determine a physical address (first physical address) in the memory mapped to the virtual address 208. Location matcher 112 may determine whether the physical address mapped to the PAP 206 (second physical address) matches the physical address (first physical address) mapped to the virtual address 208. In the example illustrated in FIG. 2A, both the first physical address (mapped to the virtual address 208) and the second physical address (mapped to PAP 206) point to the same address (physical address 212). Because the first and second physical addresses match, the exception handler will not raise an exception. In cases where the addresses do not match, the exception handler may raise an exception.

Figure 2B:
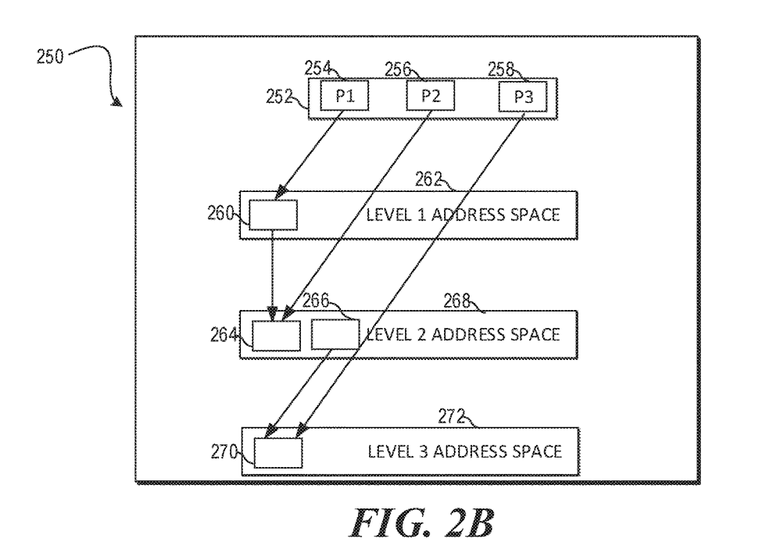
FIG. 2B is a flowchart of another example address mapping.

System 100 may also be used in environments with more than two levels of memory mappings. Turning briefly to FIG. 2B, an example address mapping 250 having three levels of address space is illustrated. The first level may correspond to a virtual address space, the second level may correspond to a physical address space and the third level may correspond to a backing physical address space (BPAS). The BPAS may be the memory addresses used in the external device/storage medium. It is appreciated that the three levels are for illustrative purposes and other numbers and types of levels may be used.

The address mapping 250 includes a set of pointers 252 including a first level pointer 254, a second level pointer 256 and a third level pointer 256. As described above, the set of pointers may be part of a capability, may be separate capabilities, etc. The first level pointer 254 points to an address 260 in a first level of address space 262. The second level pointer 256 points to an address 266 in a second level of address space 268. The third level pointer 258 points to an address 270 in a third level of address space 272.

Pointer locator 108 may load first level pointer 254 (first pointer) corresponding to address 260 (first address) in a first level of address space 262. Pointer locator 108 may also load second level pointer 256 (second pointer) that points to an address 266 (third address) in a second level of address space 268 and load third level pointer 258 (third pointer) that points to an address 270 (fifth address) in a third level of address space 272.

Pointer handler 110 may determine an address (second address) in the second level of address space 268 that is mapped to the address 260 (first address) in the first level of address space. Location matcher 112 may determine whether the determined address (second address) mapped to address 260 matches the address (third address) in the second level of address space that is mapped to the second level pointer 256. In the example illustrated in FIG. 2B, address 264 is mapped to the address 260 (mapped to first level pointer 254) and address 264 is mapped to second level pointer 256. Because the addresses match, the exception handler will not raise an exception. Although the address 264 is mapped to the address 260 in the example of FIG. 2B, this may not always be the case. In these aspects, the address 260 may be mapped to some other address in the second level of address space 268.

Pointer handler 110 may further determine an address (fourth address) in the third level of address space 272 that is mapped to the address 266 in the second level of address space. Location matcher 112 may determine whether the determined address (fourth address) mapped to address 266 matches the address (fifth address) in the third level of address space that is mapped to the third level pointer 258. In the example illustrated in FIG. 2B, address 270 is mapped to the address 260 and address 270 is mapped to third level pointer 258. Because the addresses match, the exception handler will not raise an exception. Although the address 270 is mapped to the address 266 in the example of FIG. 2B, this may not always be the case. In these aspects, the address 266 may be mapped to some other address in the third level of address space 272. In aspects where the addresses do not match, the exception handler may raise an exception.

Turning again to FIG. 1, processor 102 may execute exception handler 114 to raise an exception when the second physical address does not match the first physical address. When performing a load, the CPU may first validate that both pointer/capability arguments have the appropriate permission bits set and have a valid tag bit. Then, both the target data and pointers/capabilities from memory are loaded in parallel. The CPU translates the data capability's address using the application's page table to obtain a physical address and loads the data at that address into a cache line. Afterwards the CPU may check that the pointer/capability is valid. If the validity check succeeds, the data loaded from the pointer/capability may be stored in the output register. Otherwise, an exception may be raised.

There are a variety of ways that exception handler 114 may deal with the exception. In one aspect, the exception handler may unmap the incorrect physical address from the VA pointer and map the correct physical address to the VA pointer. For example, upon identifying that a wrong PA is encountered, the location of an original (correct) PA may be identified and mapped to the VA (or otherwise maps it). The PA pointer may be adjusted to point to the new location relative to the original VA address, and other pointers referring to the PA may also be identified and adjusted to point to the correct location.

In another aspect, the exception handler 114 may map the incorrect physical address to a second VA pointer and calculate an offset between the incorrect physical address and the correct physical address. Future address access and/or adjustments may use the calculated offset. In still another aspect, the exception handler 114 may end a program accessing the memory when the exception is raised. For example, exception handler 114 may incur a page fault and have the OS restore the mapping to the original physical address. In some aspects, any combination of these three options may be used within the same system and the behavior may be changeable at runtime.

Figure 3A:
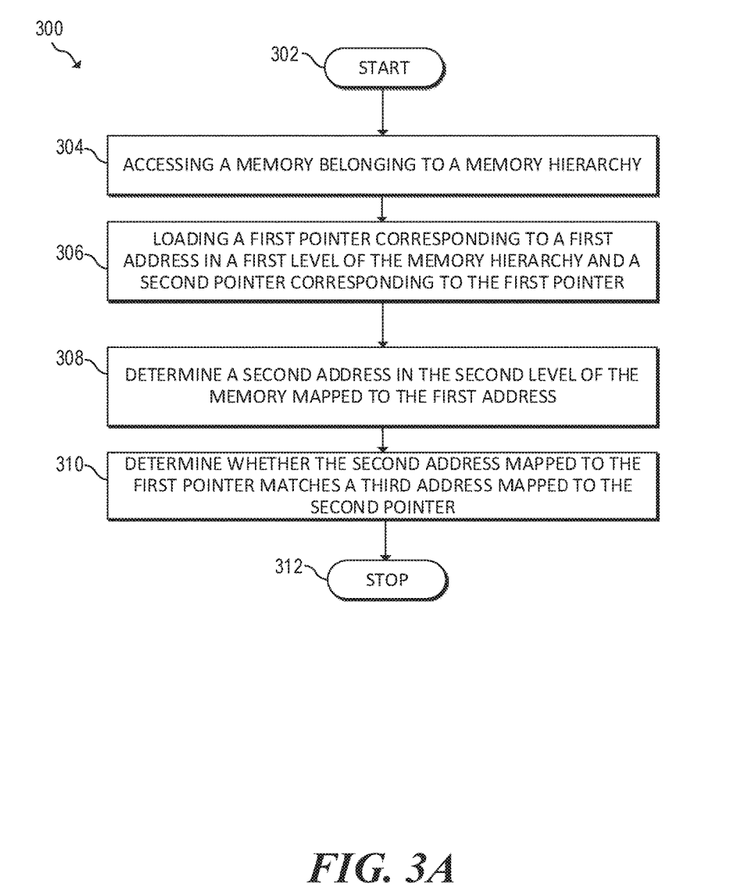
FIG. 3A is a flowchart of an example method for matching pointers across levels of a memory hierarchy.

FIG. 3A is a flowchart of an example method 300 for matching pointers across levels of a memory hierarchy. The flowchart represents processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 3A are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

Method 300 may start at block 302 and continue to block 304, where the method may include accessing a memory belonging to a memory hierarchy. The memory hierarchy may include, for example, two levels of memory: (1) a virtual address space; and (2) a physical address space. It is appreciate that this is one example and method 300 may be adapted to work with any number and types of levels of a memory hierarchy. At block 306, the method may include loading a first pointer corresponding to a first address in a first level of the memory hierarchy and a second pointer corresponding to the first pointer. The first pointer and the second pointer may be part of a single capability. The second pointer may be used to check the accuracy of the first pointer. The first pointer and the second pointer may each be separate capabilities. The first pointer and the second pointer may be loaded into a CPU register together.

At block 308, the method may include determining a second address in the second level of the memory mapped to the first address. An OS managed address mapping table may be used to determine the first physical address. At block 310, the method may include determining whether the second address mapped to the first pointer matches a third address mapped to the second pointer. The method may continue to block 312, where the method may end.

Figure 3B:
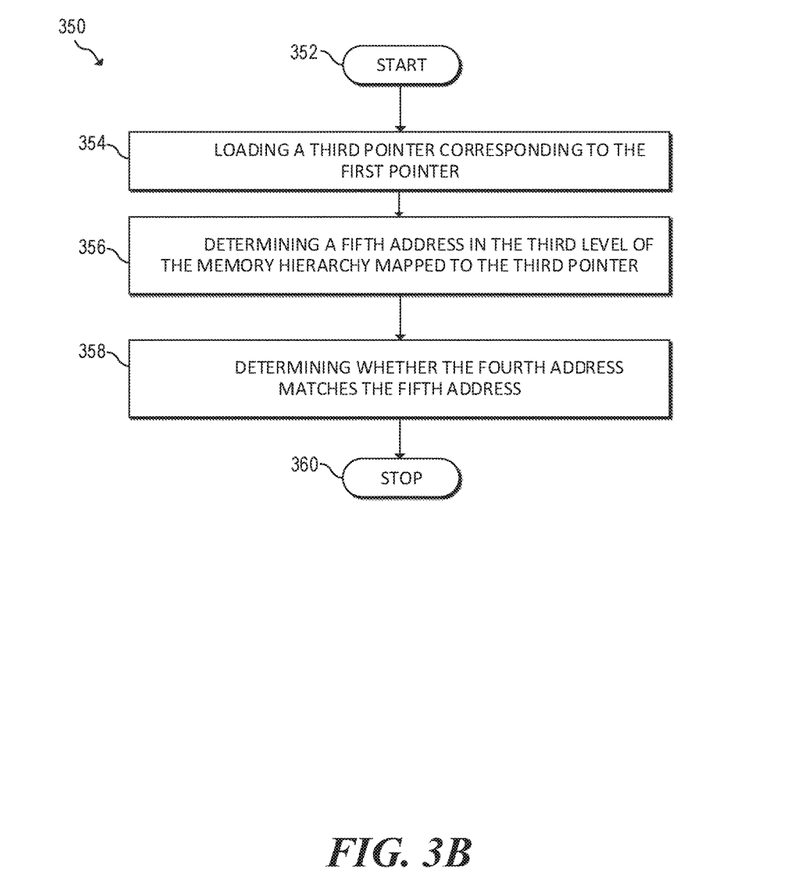
FIG. 3B is a flowchart of another example method for matching pointers across levels of a memory hierarchy.

FIG. 3B is a flowchart of an example method 350 for matching pointers across levels of a memory hierarchy. The flowchart represents processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 3B are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

Method 350 may start at block 352 and continue to block 354, where the method may include loading a third pointer corresponding to the first pointer. The first pointer and the third pointer may belong to a memory hierarchy. The memory hierarchy may include, for example, three levels of memory: (1) a virtual address space; (2) a physical address space; and (3) a backing physical address space. It is appreciated that this is one example and method 350 may be adapted to work with any number and types of levels of a memory hierarchy.

The first pointer and the third pointer may be part of a single capability. A second pointer, such as the second pointer discussed above in reference to method 300 and FIG. 3A, may also be part of the single capability. The first pointer and the third pointer may each be separate capabilities. The first pointer and the third pointer may be loaded into a CPU register together. The first pointer and the third pointer may also be loaded into a CPU register together with a second pointer. The second pointer may be used to check the accuracy of the third pointer.

At bock 356, the method may include determining a fifth address in the third level of the memory hierarchy mapped to the third pointer. At block 358, the method may include determining whether the fourth address matches the fifth address. The first pointer includes a fourth address corresponding to a third level of the memory hierarchy. The method may continue to block 360, where the method may end.

Figure 4:
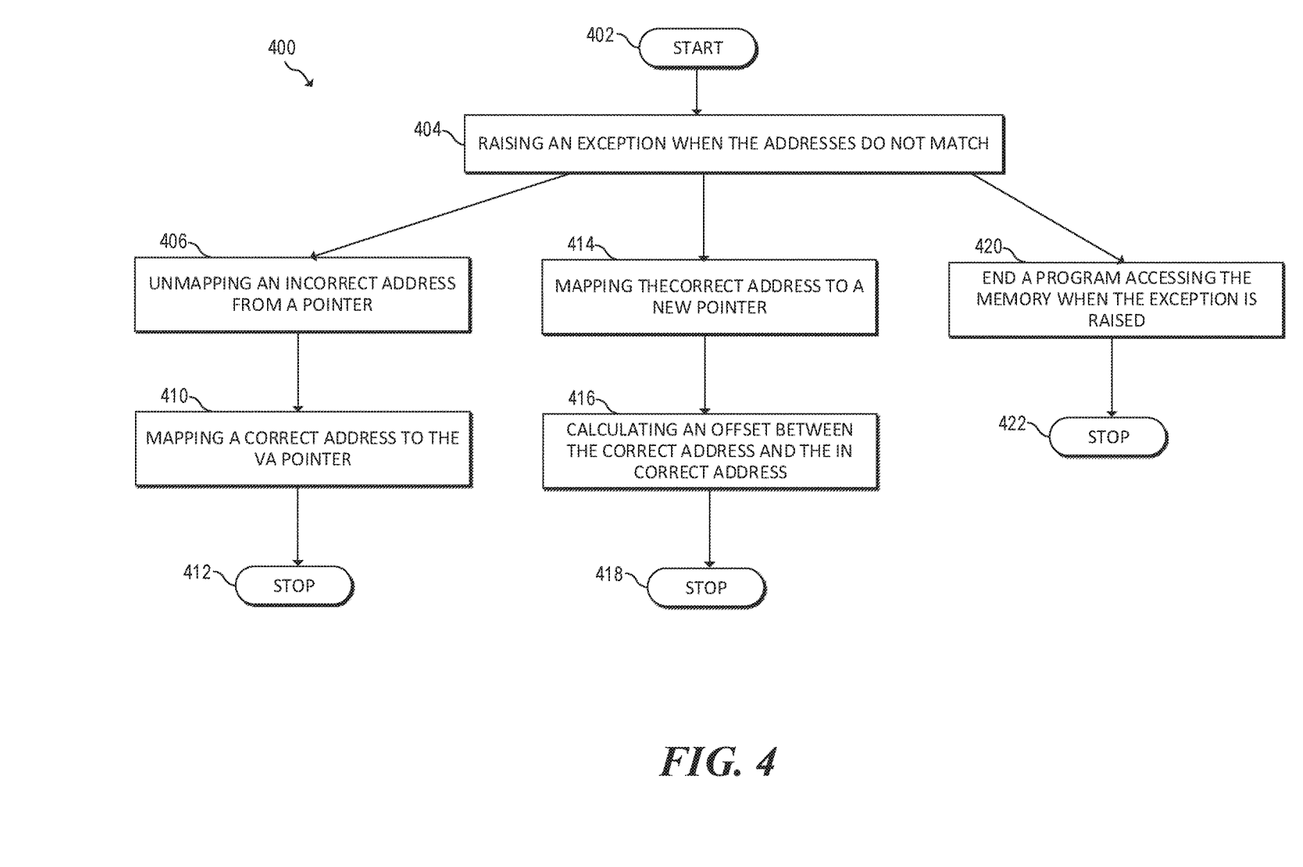
FIG. 4 is a flowchart of an example method for handling exceptions.
Figure 5:
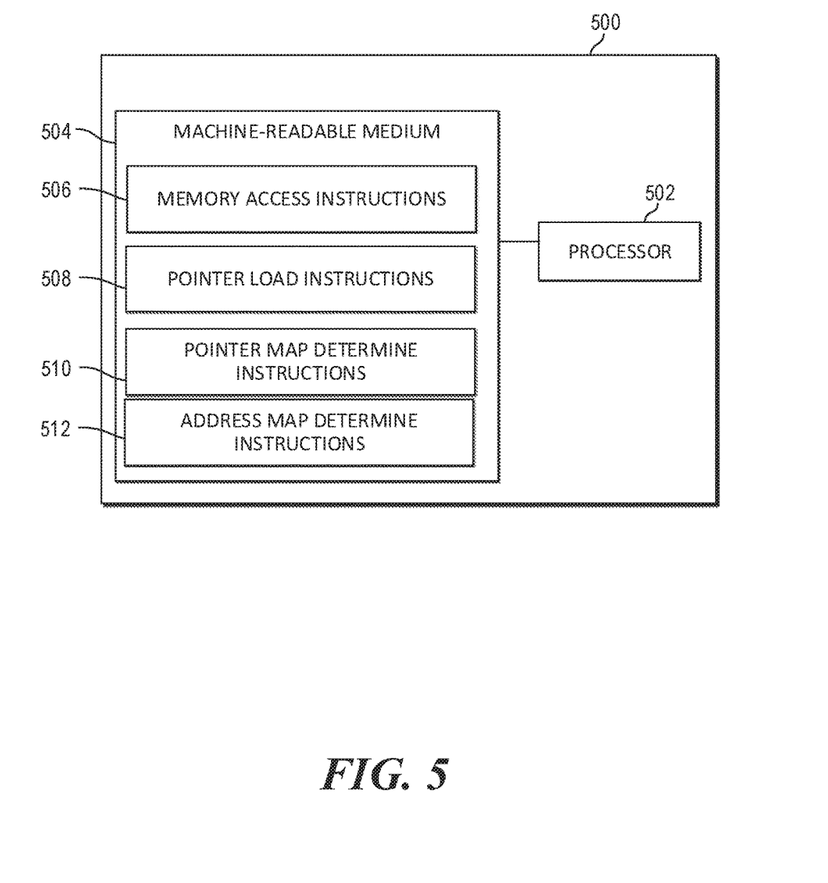
FIG. 5 is a block diagram of an example system for matching pointers across levels of a memory hierarchy.

FIG. 4 is a flowchart of an example method 400 for handling exceptions. The flowchart represents processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart shown in FIG. 5 is not intended to be so limited. Rather, it is expressly contemplated that various processes may occur in different orders and/or simultaneously with other processes than those illustrated. As such, the sequence of operations described in connection with FIG. 4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

As described above, memory addresses may be matched across levels of a memory hierarchy. For example, block 310 of method 300 describes determining whether the second address mapped to the first pointer matches a third address mapped to the second pointer. As another example, block 358 of method 350 describes determining whether the fourth address matches the fifth address. Method 400 describes a variety of example ways to deal with an exception if the addresses do not match.

Method 400 may start at block 402 and continue to block 404, where the method may include raising an exception when the addresses do not match. For example, an exception may be raised when the second address does not match the third address and/or if the fourth address does not match the fifth address. In one aspect, the method may continue to block 406, where the method may include unmapping an incorrect address from a pointer. At block 408, the method may include mapping a correct address to the first pointer. The correct address may be determined from a pointer used to check the accuracy of the other pointers. For example, the second pointer described above in reference to methods 300 and 350, may be used to check the accuracy of the other (first and third) pointers. The method may proceed to block 412, where the method may end.

For example, in reference to FIG. 3A, if it is determined that the second address mapped to the first pointer does match a third address mapped to the second pointer, it may be determined that the third address mapped to the second pointer is the correct address because the second pointer is the check pointer. Method 400 may include unmapping the second address from the first pointer mapping the third address to the first pointer.

As another example, in reference to FIG. 3B, if it is determined that the fourth address does not match the fifth address, it may be determined that the fourth address mapped to the second pointer is the correct address because the second pointer is the check pointer. Method 400 may include unmapping the fifth address from the third pointer and mapping the fourth address to the third pointer.

In another aspect, method 400 may proceed to block 414 after completing block 404. At block 414, the method may include mapping the correct address to a new pointer and at block 416, the method may include calculating an offset between the correct address and the incorrect address. Future address access and/or adjustments may use the calculated offset. The method may proceed to block 418, where the method may end.

For example, in reference to FIG. 3A, method 400 may include mapping the second address to a new pointer and calculating an offset between the second address and the third address. As another example, in reference to FIG. 3B, method 400 may include mapping the fourth address to a new pointer and calculating an offset between the fourth address and the second address.

In yet another aspect, method 400 may proceed to block 420 after completing block 404. At block 420, the method may include ending a program accessing the memory when the exception is raised. The method may continue to block 422, where the method may end.

FIG. 5 is a block diagram of an example system 500 matching pointers across levels of a memory hierarchy. In the example illustrated in FIG. 5, system 500 includes a processing core 502. Although the following descriptions refer to a single processing core, the descriptions may also apply to a system with multiple processing cores. In such examples, the instructions may be distributed (e.g., executed by) across multiple processing cores.

Processor 502 may be at least one central processing unit (CPU), microprocessor, and/or other hardware devices suitable for retrieval and execution of instructions. In the example illustrated in FIG. 5, processor 502 may fetch, decode, and execute instructions 506, 508, 510 and 512 to perform replacement functionality of a processing core. In some examples, instructions 506, 508, 510 and 512 may be stored on a machine-readable medium. The machine-readable medium may include any volatile memory, non-volatile memory, or any suitable combination of volatile and non-volatile memory. Machine-readable medium 504 may be, for example, Random Access Memory (RAM), an Electrically-Erasable Programmable Read-Only Memory (EEPROM), a storage drive, an optical disc, and/or other suitable memory. Machine-readable medium 504 may also include a random access non-volatile memory that can retain content when the power is off. Processor 502 may include at least one electronic circuit comprising a number of electronic components for performing the functionality of at least one of the instructions. With respect to the executable instruction representations (e.g., boxes) described and shown herein, it should be understood that part or all of the executable instructions and/or electronic circuits included within one box may be included in a different box shown in the figures or in a different box not shown.

Referring to FIG. 5, memory access instructions 506, when executed by a processor (e.g., 502), may cause system 500 to access a memory. Pointer load instructions 508, when executed by a processor (e.g., 502), may cause system 500 to load a virtual address (VA) pointer corresponding to a first location in the memory and a physical address (PA) pointer corresponding to the VA pointer. The VA pointer and the PA pointer may be part of a single capability. The VA pointer and the PA pointer may each be separate capabilities. The VA pointer and the PA pointer may be loaded into a CPU register together. Pointer map determine instructions 510, when executed by a processor (e.g., 502), may cause system 500 to determine a first physical address in the memory mapped to the first location in memory. Pointer map determine instructions 510 may also cause the system to access an OS managed physical address to virtual address mapping to determine the first physical address. Address map determine instructions 512, when executed by a processor (e.g., 502), may cause system 500 to determine whether the second physical addressed mapped to the PA pointer matches the first physical address.

The foregoing disclosure describes a number of examples of matching pointers across levels of a memory hierarchy. The disclosed examples may include systems, devices, computer-readable storage media, and methods for matching pointers across levels of a memory hierarchy. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

What is claimed is:

1. A system comprising:
   a memory accessor to access a memory;
   a pointer loader to load a virtual address (VA) pointer corresponding to a first location in the memory and a physical address (PA) pointer corresponding to the VA pointer;
   a pointer handler to determine a first physical address in the memory mapped to the first location in the memory;
   a location matcher to determine whether the second physical address mapped to the PA pointer matches the first physical address; and
   an exception handler to raise an exception when the second physical address does not match the first physical address.

2. The system of claim 1, wherein the exception handler is to:
   unmap the first physical address from the VA pointer; and
   map the second physical address to the VA pointer.

3. The system of claim 1, wherein the VA pointer is a first VA pointer and the exception handler is to:
   map the first physical address to a second VA pointer; and
   calculate an offset between the first physical address and the second physical address.

4. The system of claim 1, wherein the exception handler is to:
   end a program accessing the memory when the exception is raised.

5. The system of claim 1, wherein the VA pointer and the PA pointer are part of a single capability.

6. The system of claim 1, wherein the VA pointer and the PA pointer are loaded into a CPU register together.

7. The system of claim 1, wherein the location matcher is to:
   access an OS managed virtual to physical address mapping to determine the first physical address.

8. The system of claim 1, wherein the PA pointer is further mapped to a second address in a second memory and wherein:
   the pointer loader loads a third pointer, corresponding to the VA pointer, with the VA pointer and the PA pointer;
   the pointer handler determines the second address in the second memory mapped to the third pointer; and
   the location matcher determines whether the first address mapped to the PA pointer matches the second address.

9. A method comprising:
   accessing a memory belonging to a memory hierarchy;
   loading a first pointer corresponding to a first address in a first level of the memory hierarchy and a second pointer corresponding to the first pointer;
   determining a second address in the second level of the memory mapped to the first pointer; and
   determining whether the second address mapped to the first pointer matches a third address mapped to the second pointer.

10. The method of claim 9, wherein the second pointer includes a fourth address corresponding to a third level of the memory hierarchy, the method comprising:
    loading a third pointer corresponding to the first pointer;
    determining a fifth address in the third level of the memory hierarchy mapped to the third pointer; and
    determining whether the fourth address matches the fifth address.

11. The method of claim 9, comprising:
    raising an exception when a second physical address does not match a first physical address.

12. The method of claim 11, comprising:
    unmapping the second address from the first pointer; and
    mapping the third address to the first pointer.

13. The method of claim 11, comprising:
    mapping the second address to a fourth pointer; and
    calculating an offset between the second address and the third address.

14. The method of claim 9, wherein determining the second address comprises:
    accessing, by an operating system, a virtual to physical address mapping.

15. The method of claim 10, wherein a virtual address (VA) pointer and a physical address (PA) pointer are part of a single capability.

16. The method of claim 10, comprising:
    loading the VA pointer and the PA pointer into a CPU register together.

17. A non-transitory machine-readable storage medium encoded with instructions, the instructions executable by a processor of a system to cause the system to:
    access a memory;
    load a virtual address (VA) pointer corresponding to a first location in the memory and a physical address (PA) pointer corresponding to the VA pointer;

determine a first physical address in the memory mapped to the first location in memory; and determine whether the second physical address mapped to the PA pointer matches the first physical address.

18. The non-transitory machine-readable storage medium of claim 17, comprising instructions to:

access an OS managed physical to virtual address mapping to determine the first physical address.

19. The non-transitory machine-readable storage medium of claim 17, comprising instructions to:

load a third pointer, corresponding to the VA pointer, with the VA pointer and the PA pointer, wherein the PA pointer is further mapped to a second address in a second memory;

determine the second address in the second memory mapped to the third pointer; and determine whether the first address mapped to the PA pointer matches the second address.

20. The non-transitory machine-readable storage medium of claim 17, comprising instructions to:

raise an exception when the second physical address does not match the first physical address;

unmap the first physical address from the VA pointer; and map the second physical address to the VA pointer.

* * * * *